United States Patent Office 3,681,053
Patented Aug. 1, 1972

3,681,053
USE OF HIGH-SILICON AS THE REDUCTANT
FOR THE METALLOTHERMIC PRODUCTION
OF MAGNESIUM
Julian M. Avery, 47 Old Orchard Road,
Chestnut Hill, Mass. 02132
No Drawing. Continuation-in-part of application Ser. No.
796,214, Feb. 3, 1969, which is a continuation-in-part
of application Ser. No. 648,856, June 27, 1967. This
application Apr. 6, 1970, Ser. No. 26,117
The portion of the term of the patent subsequent to
Feb. 23, 1988, has been disclaimed
Int. Cl. C22b 45/00
U.S. Cl. 75—67                                    2 Claims

ABSTRACT OF THE DISCLOSURE

High-silicon is used as the reductant for the production of magnesium from magnesium oxide at elevated temperature in the presence of molten oxidic slag. Silicon metal or a silicon alloy, containing at least 80 percent silicon and no more than 20 percent aluminum and a minor amount of iron or other non-reactive components, is used as the high-silicon reducing agent. In order to permit operation at or near atmospheric pressure and to decrease the silicon content of the magnesium product, preferably inert gas is provided in the vapor space of the reaction-condensation zone.

RELATED APPLICATIONS

This application is a continuation-in-part of co-pending application Ser. No. 796,214, filed Feb. 3, 1969, which in turn is a continuation-in-part of the co-pending application Ser. No. 648,856, filed June 27, 1967, now U.S. Pat. No. 3,579,326, issued on May 18, 1971.

BACKGROUND OF THE INVENTION

The prior processes for the production of magnesium by a metallothermic reduction of magnesium oxide in molten oxidic slag generally employ a silicon alloy, usually either ferro-silicon or alumino-silicon, having a maximum silicon content of 80 percent by weight.[1] See generally the discussion of the prior art in my copending applications Ser. No. 648,856, filed June 27, 1967, now Pat. No. 3,579,326 issued May 18, 1971 and Ser. No. 796,214, filed Feb. 3, 1969, and my applications filed concurrently herewith.

The use in such prior processes of silicon metal or high-silicon alloys has been considered impractical, in part because of the relatively high cost of such reductants, but also because of the tendency of high-silicon to increase the silicon content of the magnesium product—which at about 500–600 p.p.m. has been at a maximum acceptable level and in the view of some experts already too high for certain purposes, such as the use of the magnesium product for the preparation of titanium.

It is therefore the major objective of this invention to utilize silicon metal or a high-silicon alloy as the reductant in a metallothermic process for the production of magnesium under conditions that make its use economical and without objectionable contamination of the magnesium product.

BRIEF DESCRIPTION OF THE INVENTION

The process of this invention employs in the metallothermic production of magnesium a reductant of silicon metal or a high-silicon alloy, that is a reductant comprising about 80–99.75 percent silicon, 0–20 percent aluminum and 0.25–10 percent iron, and preferably at least 90 percent silicon. In order to take advantage of the increased Si activity of the above reductant without a concomitant contamination by silicon of the magnesium product, it is preferable to provide in the atmosphere of the reaction zone, i.e. above the molten slag, an inert gas at a partial pressure of at least 0.05 atmosphere.

The molten slag contains an oxide mixture of calcium oxide, silica, magnesia and, if desired, alumina, in proportions that provide at once both an active and a molten reaction medium at a temperature of about 1400–1700° C. These oxides in proper proportions are provided by the choice of magnesium oxide ore, preferably a mixture of calcined dolomite and magnesite, and from the reaction which produces silica and, if aluminum is present in the reductant, alumina. If aluminum is not present in the reductant in sufficient quantity to provide the requisite alumina in the slag, alumina itself or the like, such as bauxite or clay may be added. A suitable slag comprises 10–60 percent calcium oxide, 0–35 percent aluminum oxide, 20–50 percent silicon oxide and 3–25 percent magnesium oxide.

DETAILED DESCRIPTION OF THE INVENTION

I have found that, quite unexpectedly, the use of silicon metal or a high-silicon alloy as the reducing agent in a metallothermic process for the production of magnesium results in process and product advantages which more than outweigh the increased cost of such reducing agents over conventional ferrosilicon or alumino-silicon alloys.

The advantages of the present invention may be obtained in conjunction with those of my other inventions. Thus, it is preferred to employ the high-silicon reducing agent in a system which incorporates an atmosphere of inert gas in the reaction-condensation zone, as described and claimed in my copending applications, Ser. No. 796,214, filed Feb. 3, 1969 and Ser. No. 26,118 filed Apr. 6, 1970. In particular, when the invention of the latter application is used conjunctively with this invention, the use of high-silicon need not result in an undue increase of silicon in the magnesium product.

I have found also that the use of high-silicon (the term here used to include both silicon metal and high-silicon alloys of greater than 80 percent silicon), increases the reducing agent activity in the reaction zone over ferrosilicon and consequently increases the available partial pressure of the evolving magnesium vapor. This is particularly true when the silicon content of the "spent" alloy is increased in the range of 25 to 65 percent. While it may at first seem that increased silicon in the "spent" alloy should be detrimental to the process as a result of lowered reductant efficiency, this is not entirely the case. A "spent" ferrosilicon alloy having 40–50 percent silicon is a readily sold byproduct, while a 25 percent (or less) silicon alloy is hardly worth reclamation. Thus, the realization of a valuable "spent" alloy at least partially offsets the increased costs due to the more expensive high-silicon and to lowered efficiency, if any.

When the present invention is used with an inert-gas atmosphere, I have further found that any required increase in magnesium partial pressure (due to the inert-gas mass-transfer barrier in the system, see generally my copending application, Ser. No. 26,118) may be provided by an increased activity in the reductant, which is reflected in an increased silicon content in the "spent" alloy. In other words, the silicon content of the "spent" alloy is raised to provide sufficient magnesium partial pressure to compensate for the presence in the system of the inert gas, in accordance with the reaction:

$$2MgO + Fe_xSi_{(1+y)} \rightarrow SiO_2 + 2Mg(\uparrow) + Fe_xSi_y$$

---

[1] All percentages employed herein are by weight.

It can be seen, then, that the inert gas "barrier" and the silicon content ($y$) of the "spent" alloy ($Fe_xSi_y$) are interrelated.

Another way to express the relationship between the silicon content of the "spent" alloy and magnesium partial pressure is that when, in a given system, the magnesium partial pressure is raised (for whatever purpose) the silicon content of the "spent" alloy is consequently raised, although not necessarily proportionately. Thus, it follows that the use of high-silicon as a reductant gives a higher potential thermodynamic magnesium vapor pressure to the reaction than does the use of ferrosilicon. This can be translated into either a higher magnesium vapor partial pressure or a higher rate of magnesium production, or even both.

The magnesium oxide reactant may comprise magnesia, usually derived from magnesite by calcination, or calcined dolomite, an equimolar combination of magnesium oxide and calcium oxide, or mixtures of both. In order to enhance the reaction the magnesium oxide content in the reaction zone should be maintained relatively high, above 2 percent and preferably between about 10 and 20 percent, measured as a fraction of the oxidic slag.

In accordance with the present invention, high-silicon is used as a reducing agent for the metallothermic production of magnesium. "High-silicon" includes silicon metal, containing 95–99.75 percent silicon and the remainder non-reactant metals such as iron, and aluminosilicon or other alloys containing greater than 80 percent silicon. It is advantageous that the iron content of the high-silicon be as low as possible. As a practical limit, the iron can be decreased to about 0.25 to 0.5 percent, although by other methods which presently appear impractical, it can be reduced even further. One reason for the low iron content is that the iron is non-reactive and passes through to the spent alloy; and, given a certain spent alloy composition, the lower the iron content in the reductant the less silicon will be lost to the spent alloy. Titanium is another non-reactive metal found in high-silicon and the other raw materials and for the purposes of this invention it may be treated as an equivalent to iron. It follows then that the titanium content should likewise be as low as possible.

I have found that under the current market prices for silicon, there is little or no cost penalty in the use of high-silicon in place of ferrosilicon in a metallothermic process for the production of magnesium. And, as discussed above, the use of high-silicon results in numerous advantages.

Preferably, the atmosphere in the reaction-condensation zone contains inert gas such as hydrogen, helium, argon or mixtures thereof. The inert gas atmosphere preferably is static or substantially static, see generally my concurrently filed, copending application, Ser. No. 26,118. I have found that, with a given high-silicon reducing agent and slag composition, as the pressure of the inert gas is increased, the silicon content of the residual alloy will likewise increase and find its own level at the point where the magnesium partial pressure necessary to maintain the required mass-transfer rate is achieved. I have found also that it is possible to take advantage of the increased activity of the high-silicon without concomitant contamination with silicon of the magnesium product by the use of the inert gas, as described in the above application.

The oxidic slag generally contains a mixture of calcium, aluminum and silicon oxides, sometimes called a calcium-aluminum-silicate or lime-alumina-silica slag, in combination with the magnesium oxide reactant. One or more of these oxides may of course be a product of the reaction, depending on the reductant used, which could, along with the consumption of magnesium oxide, vary the slag composition as the reaction proceeds. The composition of the slag in any case is about 10–60 percent calcium oxide, 0–35 percent aluminum oxide, 20–50 percent silica and 2–25 percent magnesia.

The temperature of the slag, and hence of the system, depends primarily on the slag composition (i.e., it must be molten) but the temperature is usually at least 1300° C., and preferably about 1400–1700° C. In the process of the present invention it is highly desirable to maintain in the reaction zone a temperature of at least about 1400° C. to promote good reaction conditions, but temperatures higher than about 1700° C. are undesirable because they create difficult engineering and operating problems. It is therefore desirable to employ a slag whose melting point is not higher than about 1600° C. in order that enough superheat may be applied to impart sufficient fluidity to the slag without the necessity of excessively high temperature. Thus, a temperature of about 1400–1700° C. in the reaction zone is preferred, although in certain instances higher or lower temperatures are suitable and may be desired.

On the other hand, slags of relatively high viscosity can be used in the present process because there is in the furnace no bed of solid material through which the slag must find its way in order to reach the tap hole for removal from the furnace. Thus, the problem of slag viscosity is not as great as it is in most metallurgical processes, but it is still a factor requiring attention.

In general, the composition of the slag is determined in the present process by the ratio of aluminum to silicon fed as the reducing agent; the degree of utilization of silicon as reductant; the relative proportions of magnesium oxide fed as magnesia and as dolomite lime; and the amount of alumina (if any) as a flux.

Ordinarily, diffusion of magnesium vapor alone is sufficient to provide for the mass transfer from the reactor to the condenser. However, if desired, a stream of the inert gas may be introduced into the furnace and fed through the condenser, in order to augment the magnesium flow to the condenser, in which case a recycle system may be desired to recover inert gas, especially if a vacuum system is employed.

In the operation of a process such as has been described, small amounts of impurities in the raw materials fed to the system (e.g., residual $CO_2$ and $H_2O$ in the oxidic portion of the charge, and air trapped with the raw materials in the feed hoppers) may find their way into the furnace and produce gases, such as $H_2$ or $CO$, which should be vented from the system. These gases may be removed as required by bleeding, or by removal of the inert gas, in which they will be present as impurities, in order to prevent the buildup of reactive gas on the one hand, or alternatively, to prevent an increase of pressure.

The use of the inert gas recycle in conjunction with an atmosphere of substantially static inert gas may also be employed with the present invention, including means to control the flow of inert gas from the furnace to the condenser, to provide a highly efficient method to control the process as described in my copending application, Ser. No. 26,118.

Because of the increased activity of the high-silicon reducing agent of the present invention it is possible to increase the absolute pressure of the reaction system, whether or not an inert gas is employed. The operation of the present process under relatively high absolute pressure significantly decreases the leakage of air into the system. This decrease is advantageous, since the presence of air results in the reaction of oxygen and nitrogen with the magnesium product not only to decrease yield but also to form accretions of solid matter on the system walls. In particular the decrease of solids deposited on the heat transfer surfaces substantially increases the condenser efficiency and extends the period between shutdowns. Moreover, a high absolute pressure, particularly as atmospheric pressure is approached, makes it possible to operate the process as a continuous or semi-continuous process, with attendant benefits, such as facilitating removal of spent slag and magnesium product. Further, even if a batch process is used, the need for a hermetically sealed reaction-condensation system may be eliminated—and problems, such as vacuum breaking, may be avoided—completely, or at least in part.

I claim:

1. An improved process for the production of magnesium by the metallothermic reduction of magnesium oxide in the presence of a molten oxdic slag comprising abaout 10–60 percent calcium oxide, 0–35 percent aluminum oxide, 20–50 percent silicon dioxide and 2–25 percent magnesium oxide, at a temperature of about 1300–1700° C. and by the evolution and condensation of magnesium, wherein the improvement comprises employing as a reducing agent a high-silicon selected from the group consisting of silicon metal and silicon alloys consisting essentially of about 80–99.75 percent silicon, 0–20 percent aluminum and 0.25–10 percent iron and conducting the reduction in the presence of an atmosphere of inert gas at a partial pressure of at least about 0.05 atm.

2. The process of claim 1, wherein the reducing agent comprises 95–99.75 percent silicon.

References Cited

UNITED STATES PATENTS

| | | | |
|---|---|---|---|
| 3,441,402 | 4/1969 | Magee et al. | 75—10 R |
| 3,475,162 | 10/1969 | Rhodes et al. | 75—67 |
| 3,427,152 | 2/1969 | Eisenberg et al. | 75—67 |
| 3,567,431 | 3/1971 | Schmidt | 75—10 |

GEORGE T. OZAKI, Primary Examiner

U.S. Cl. X.R.

75—10 R, 10 P, 10 A